United States Patent
Morimoto

(10) Patent No.: US 11,079,983 B2
(45) Date of Patent: Aug. 3, 2021

(54) INFORMATION PROCESSING APPARATUS THAT SAVES, IN A SHARED MEMORY, INFORMATION FOR ACCESSING A DEVICE USING A URL VIA A USB, AND METHOD OF CONTROLLING SAME

(71) Applicant: CANON KABUSHIKI KAISHA, Tokyo (JP)

(72) Inventor: Hiroaki Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/562,695

(22) Filed: Sep. 6, 2019

(65) Prior Publication Data

US 2020/0089445 A1 Mar. 19, 2020

(30) Foreign Application Priority Data

Sep. 14, 2018 (JP) .............................. JP2018-172828

(51) Int. Cl.
*G06F 3/12* (2006.01)
*H04L 29/08* (2006.01)
*H04L 29/12* (2006.01)

(52) U.S. Cl.
CPC .......... *G06F 3/1236* (2013.01); *G06F 3/1203* (2013.01); *G06F 3/1205* (2013.01); *G06F 3/1231* (2013.01); *G06F 3/1279* (2013.01); *G06F 3/1284* (2013.01); *H04L 61/2007* (2013.01); *H04L 61/2076* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,742,089 B1 * | 5/2004 | Inoue | G06F 13/1647 |
| | | | 711/149 |
| 10,466,940 B2 | 11/2019 | Morimoto | |
| 2007/0253035 A1 | 11/2007 | Takesada | |
| 2013/0326012 A1 * | 12/2013 | Hashimoto | G06F 13/10 |
| | | | 709/217 |
| 2014/0139877 A1 * | 5/2014 | Ohara | G06F 3/1293 |
| | | | 358/1.15 |
| 2014/0139878 A1 * | 5/2014 | Kadota | G06K 15/183 |
| | | | 358/1.15 |

FOREIGN PATENT DOCUMENTS

JP 2007-300480 A 11/2007

* cited by examiner

Primary Examiner — Miya J Williams
(74) Attorney, Agent, or Firm — Venable LLP

(57) ABSTRACT

An information processing apparatus connected to a device to which an IP address is not set is provided. The apparatus acquires device information that includes unique information of the device, decides a free port number and decide an address, which includes the decided port number, as an access destination for acquiring data from the device, shares the address with an access source, and notifies the unique information and the port number, wherein, when the access source accesses the shared address, the access is detected based on the port number and data is requested from the device corresponding to the unique information, and when the data is received from the device, the data is transmitted to the access source.

12 Claims, 16 Drawing Sheets

FIG. 6

| UNIQUE INFORMATION | URL |
|---|---|
| VID_04A9&PID_1234&ABC1234 | http://localhost:61234/index.html |
| VID_04A9&PID_5678&ABC5678 | http://localhost:62234/index.html |
| VID_04A9&PID_12AB&12AB56 | http://localhost:65341/index.html |

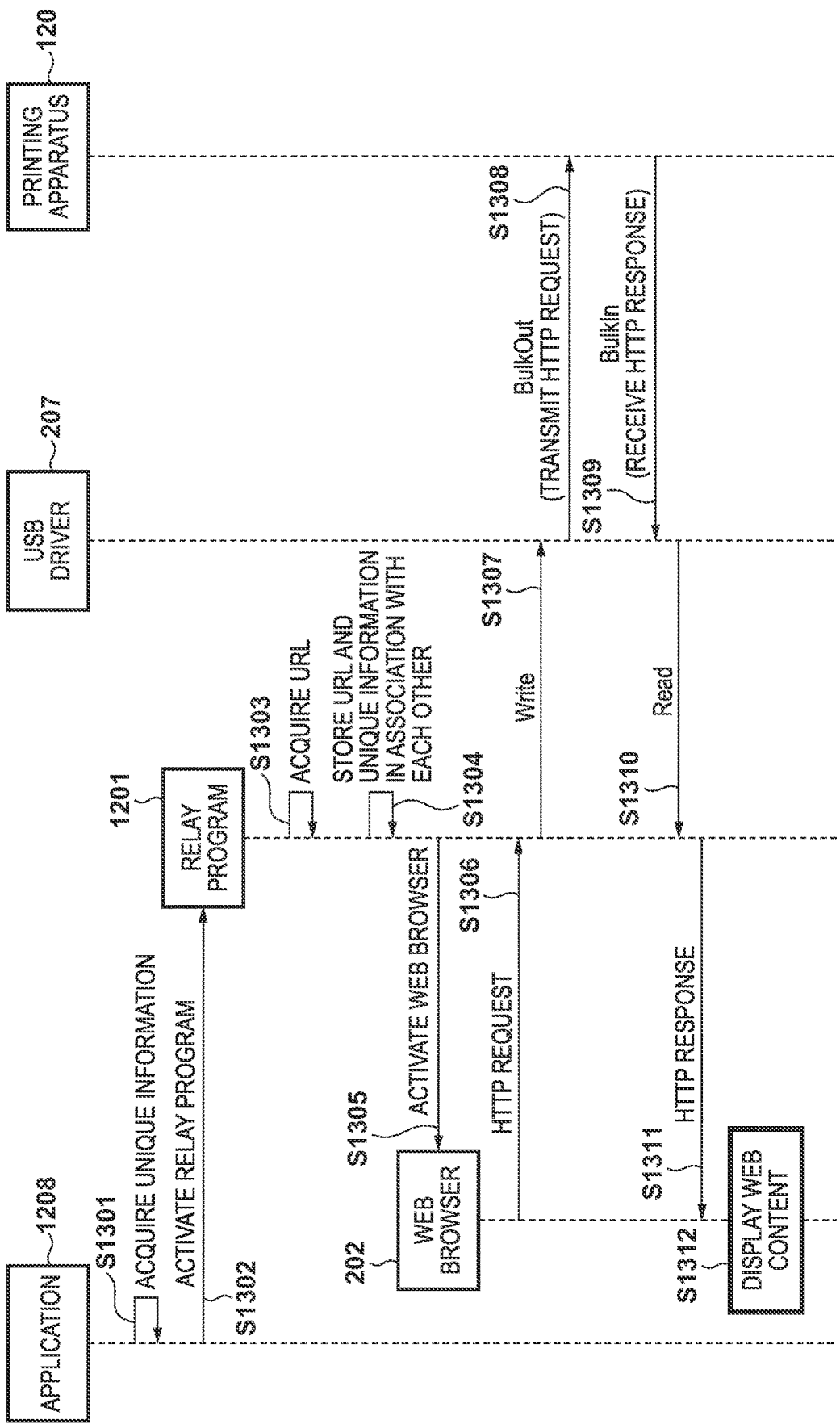

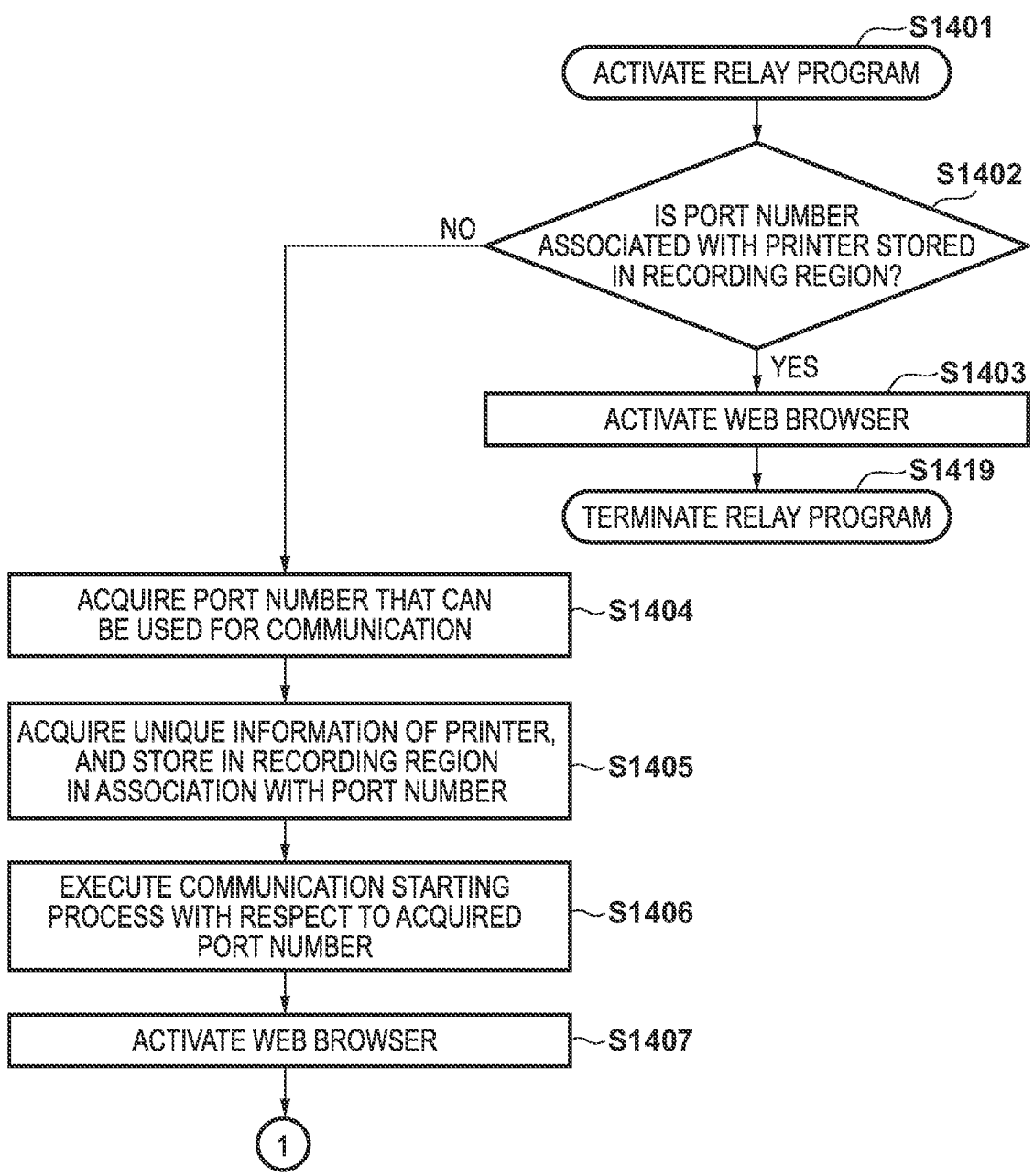

INFORMATION PROCESSING APPARATUS THAT SAVES, IN A SHARED MEMORY, INFORMATION FOR ACCESSING A DEVICE USING A URL VIA A USB, AND METHOD OF CONTROLLING SAME

BACKGROUND OF THE INVENTION

Field of the Invention

The present invention relates to an information processing apparatus for communicating with a peripheral device via a relay program, a method of controlling an information processing apparatus, and a storage medium.

Description of the Related Art

Conventionally, there has been disclosed a technique of providing an image processing apparatus with a Web server function and displaying Web content of the image processing apparatus by an application (for example, a web browser) executed on the information processing apparatus (refer to, for example, Japanese Patent Laid-Open No. 2007-300480). In this case, the user inputs an IP address of the image processing apparatus to a web browser, for example, to display Web content of the image processing apparatus.

An information processing apparatus may communicate, via a predetermined interface, with an image processing apparatus to which an IP address is not assigned. For example, a case in which the information processing apparatus and the image processing apparatus are connected to each other via USB or Bluetooth is given as an example. In such a case, a technique in which the information processing apparatus displays Web content of the image processing apparatus is required.

SUMMARY OF THE INVENTION

Therefore, the present invention has the following configuration. That is, according to an aspect of the present invention, an information processing apparatus is provided, the information processing apparatus operable to connect, through a predetermined interface, to a device to which an IP address is not set, comprising: an acquisition unit configured to acquire device information that includes unique information of the device; a deciding unit configured to decide a free port number and decide an address, which includes the decided port number, as an access destination for acquiring data from the device; a sharing unit configured to share the address decided by the deciding unit with an access source; and a notification unit configured to notify a communication unit of the unique information and the port number, wherein, in a case where the access source accesses the address acquired from the sharing unit, the communication unit detects the access based on the port number and requests, via the predetermined interface, data from the device corresponding to the unique information, and when the data is received from the device via the predetermined interface, the data is transmitted to the access source.

In addition, according to an aspect of the present invention, an information processing apparatus is provided, the information processing apparatus operable to connect, through a predetermined interface, to a device to which an IP address is not set, comprising: a relay unit; an acquisition unit configured to acquire device information that includes unique information of the device; a deciding unit configured to decide a free port number and decide an address, which includes the decided port number, as an access destination for acquiring data from the device; a sharing unit configured to share the address decided by the deciding unit; and a communication unit configured to, when there is access to the address decided by the deciding unit, detect the access based on the port number, make a request to the device corresponding to the unique information for data from the device via the interface, and transmit the data to a web browser upon receiving the data from the device via the interface.

According to the present invention, even in a case of communicating, via a predetermined interface, with an image processing apparatus to which an IP address is not assigned, an application executed on an information processing apparatus can display Web content of the image processing apparatus.

Further features of the present invention will become apparent from the following description of exemplary embodiments with reference to the attached drawings.

BRIEF DESCRIPTION OF THE DRAWINGS

FIG. 6 is a conceptual diagram of shared memory.

FIG. 13 is a sequence diagram illustrating communication processing of the entirety of the system in the third embodiment.

FIGS. 14A and 14B show a flow chart illustrating processing of a relay program in the third embodiment.

DESCRIPTION OF THE EMBODIMENTS

Hereinafter, preferred embodiments of the present invention will be described in detail with reference to the accompanying drawings. Note that the following embodiments do not limit the present invention according to the scope of the claims, and all combinations of the features described in the present embodiment are not necessarily indispensable for the solving means of the present invention.

First Embodiment

Figure 1:
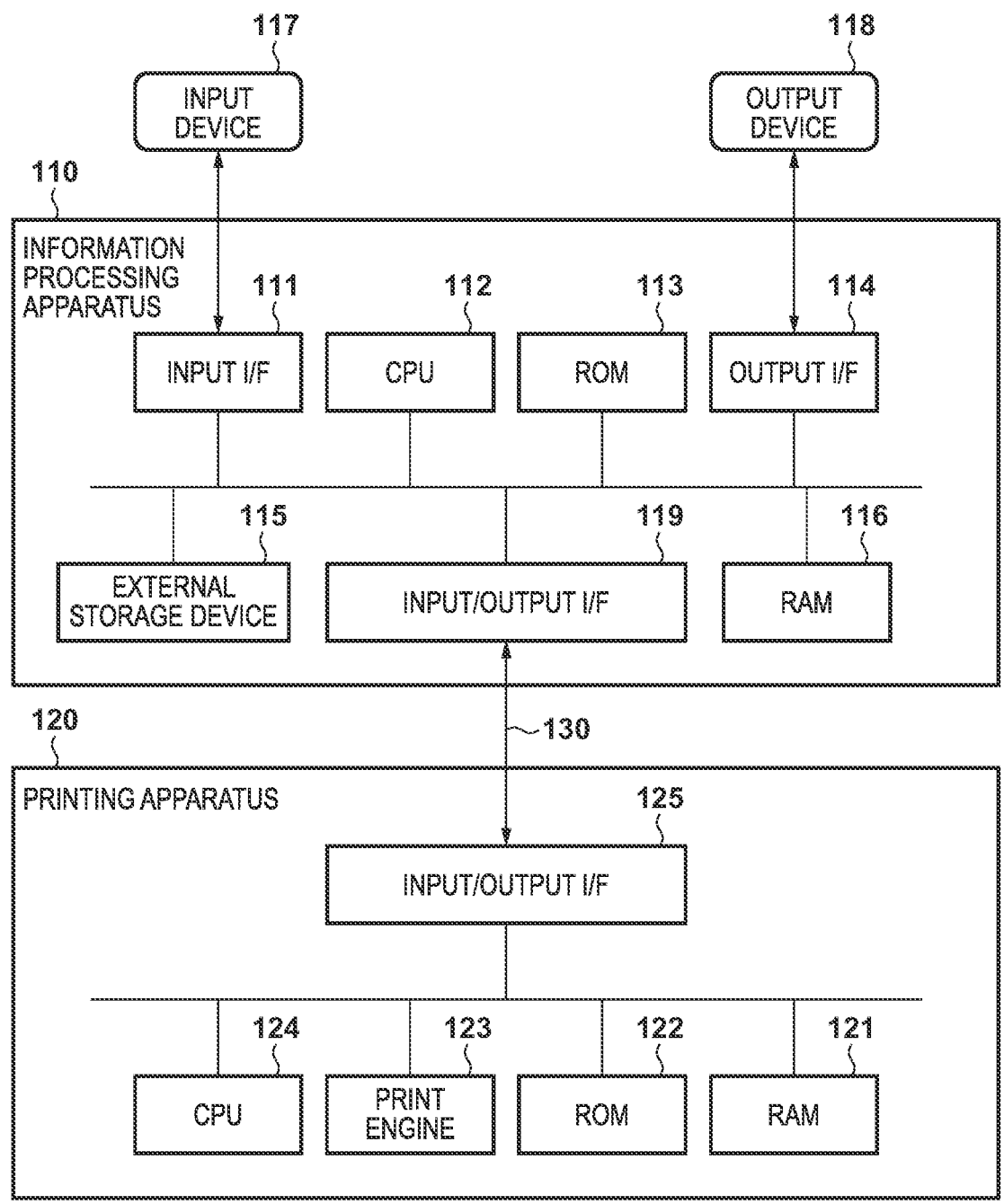
FIG. 1 is a block diagram illustrating an electrical configuration of a printing apparatus and an information processing apparatus.

FIG. 1 is an example of a block diagram illustrating an overall configuration of a system configured by an information processing apparatus 110 and a printing apparatus 120 connected to the information processing apparatus 110. The information processing apparatus 110 includes an input I/F 111, a CPU 112, a ROM 113, an output I/F 114, an external storage device 115, a RAM 116, an input device 117, an output device 118, and an input/output I/F 119. The ROM 113 stores initialization programs, and the external storage device 115 stores an OS (operating system), a printer driver, and various other data. The RAM 116 is used by various programs stored in the external storage device 115 as a work memory. The input device 117 is used for data input and operation instructions, and is connected to an input I/F 111. The output device 118 is used for data display and notification of a state, and is connected to an output I/F 114.

The printing apparatus 120 is configured from a RAM 121, a ROM 122, a print engine 123, a CPU 124, and an input/output I/F 125. The information processing apparatus 110 and the printing apparatus 120 are connected by a USB (Universal Serial Bus) (trademark) cable 130. In the present embodiment, a case is described in which the information processing apparatus 110 and the printing apparatus 120 are connected via USB, but the invention of embodiments described later may be applied when they are connected by another method. In particular, it can be used in a case where an IP address is not set in the printing apparatus 120. Therefore, for example, the present invention of the embodiments described later may be applied to a case where the information processing apparatus 110 and the printing apparatus 120 are connected by Bluetooth. The RAM 121 is used as a work memory of the CPU 124, and is also used as a buffer for temporarily storing received data. The ROM 122 stores control instructions. The print engine 123 performs printing based on data stored in the RAM 121. The CPU 124 controls the printing apparatus 120 according to a control command stored in the ROM 122. Note that, in the present embodiment, the division of processing between the information processing apparatus 110 and the printing apparatus 120 is illustrated as described above, but a form of division of processing does not depend on this.

Software Structure

Figure 2:
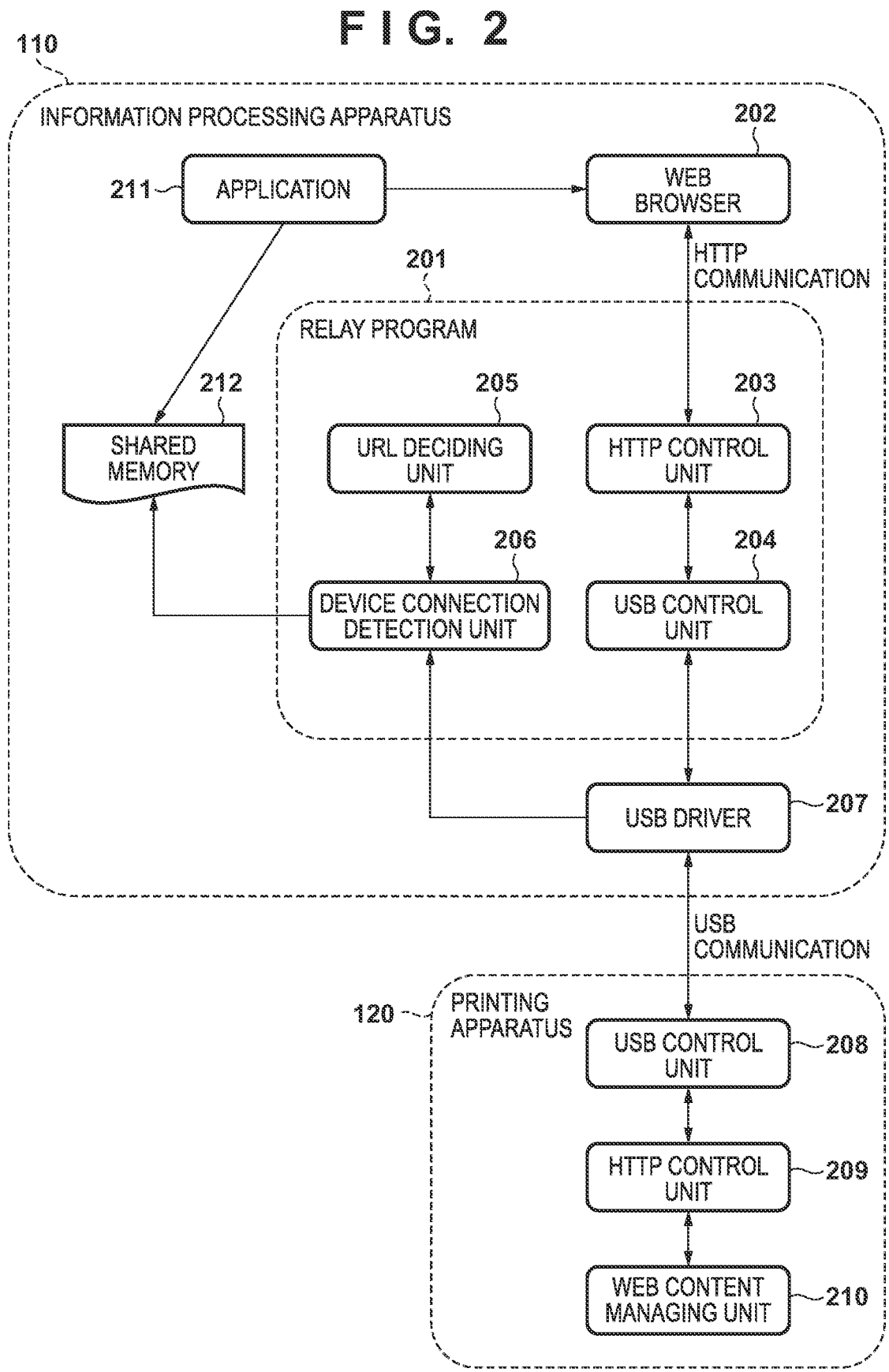
FIG. 2 is a block diagram illustrating a system configuration in a first embodiment.

FIG. 2 is an example of a block diagram conceptually illustrating the configuration of the present embodiment. A relay program 201 runs on the information processing apparatus 110 and relays communication between a web browser 202 and the printing apparatus 120. The relay program 201 includes an HTTP control unit 203, a USB control unit 204, a URL deciding unit 205, and a device connection detection unit 206. The HTTP control unit 203 performs HTTP communication with the web browser 202, and transmits an HTTP (HyperText Transfer Protocol) request received from the web browser 202 to the USB control unit 204. In addition, the HTTP control unit 203 replies to the web browser 202 with information received from the printing apparatus 120 via the USB control unit 204 as an HTTP response. That is, the web browser 202 is an access source for the HTTP request, and a designated URL is an access destination. The USB control unit 204 transmits the request data inputted from the HTTP control unit 203 to the printing apparatus 120 via a USB driver 207. Further, in response to an instruction from the HTTP control unit 203, the USB control unit 204 returns, to the HTTP control unit 203, response data received from the printing apparatus 120 via the USB driver 207. Further, the USB driver 207 manages information of peripheral devices connected via a USB interface, and, in accordance with a request, replies with information of the peripheral devices connected to the information processing apparatus 110.

The device connection detection unit 206 acquires, from the USB driver 207, information on a device connected via the USB interface, that is, a peripheral device. Then, the device connection detection unit 206 detects, from the acquired information of the peripheral apparatus, that a printing apparatus capable of communicating with the relay program 201 is connected. Upon detecting that a printing apparatus capable of communicating with the relay program 201 is newly connected, the device connection detection unit 206 acquires a URL corresponding to the printing apparatus from the URL deciding unit 205. A URL is an abbreviation of universal resource locator, and is location information (or destination information) indicating the location (or destination) of data or the like to be accessed, and corresponds to an address. The URL deciding unit 205 decides a URL to be used when the web browser 202 performs HTTP communication with the HTTP control unit 203. The URL decided by the URL deciding unit 205 has a format including a TCP port number such as http://localhost:<usable TCP port number>. Note that a TCP port number may be simply written as a port number below. The device connection detection unit 206 associates information identifying the printing apparatus 120 (for example, a vendor ID, a product ID, a serial number, etc., as described later) with the URL corresponding to the printing apparatus acquired from the URL deciding unit 205, and stores the URL in the shared memory 212. The shared memory 212 is a region that can be referred to by the relay program 201 and any application 211 running on the information processing apparatus 110. The shared memory is used by the application 211 and the relay program 201 to share unique information of the printing apparatus and the URL that is unique to the printing apparatus. The application 211 has a function of displaying a Web page of a printing apparatus connected to the information processing apparatus 110. An example of the function will be described later with reference to a <web page display button 303> in FIG. 3. When the Web page display function of the application 211 is executed, the application 211 refers to the shared memory 212 and acquires the URL associated with the designated printing apparatus. Thereafter, the application 211 activates the web browser 202, designating the URL acquired from the shared memory 212.

The printing apparatus 120 is one peripheral device that can be connected to the information processing apparatus 110, and includes a USB control unit 208, an HTTP control unit 209, and a web content managing unit 210. The USB control unit 208 inputs data received from the USB driver 207 of the information processing apparatus 110 to the HTTP control unit 209, and, in response to a request from the USB driver 207, replies with data acquired from the HTTP control unit 209. The HTTP control unit 209 interprets the data inputted from the USB driver 207 as an HTTP request, and acquires, from the web content managing unit 210, content designated by the request. In addition, the HTTP control unit 209 converts the content acquired from the web content managing unit 210 into an HTTP response format, and returns the converted content to the USB control unit 208. The web content managing unit 210 generates the Web content designated by the HTTP control unit 209 and replies to the HTTP control unit 209. Examples of content generated by the web content managing unit 210 include HTML (HyperText Markup Language), XML (Extensible Markup Language), and image data.

Figure 3:
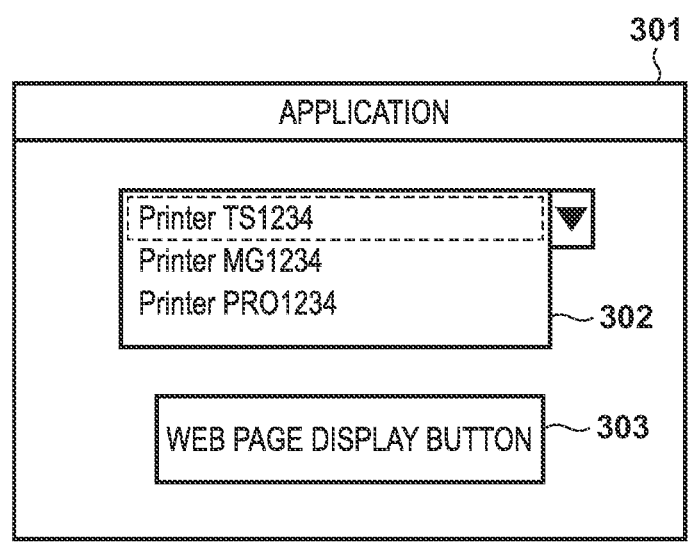
FIG. 3 is a schematic diagram illustrating a screen configuration of a Web page display function provided by an application.

FIG. 3 illustrates an example of the function, provided by the application 211, of displaying a Web page of a printing apparatus connected to the information processing apparatus 110. A screen 301 is configured by a printing apparatus selection unit 302 for a user to select an arbitrary printing apparatus from among printing apparatuses connected to the information processing apparatus 110, and a web page display button 303 for opening a Web page of the printing apparatus selected by the printing apparatus selection unit 302. When the web page display button 303 is pressed, the application 211 refers to the shared memory 212, and acquires a URL associated with the printing apparatus selected by the printing apparatus selection unit 302. Thereafter, the application 211 activates the web browser 202, designating the acquired URL. FIG. 3 is an example of a user interface.

Procedure for Acquiring Content Via USB

Figure 4:
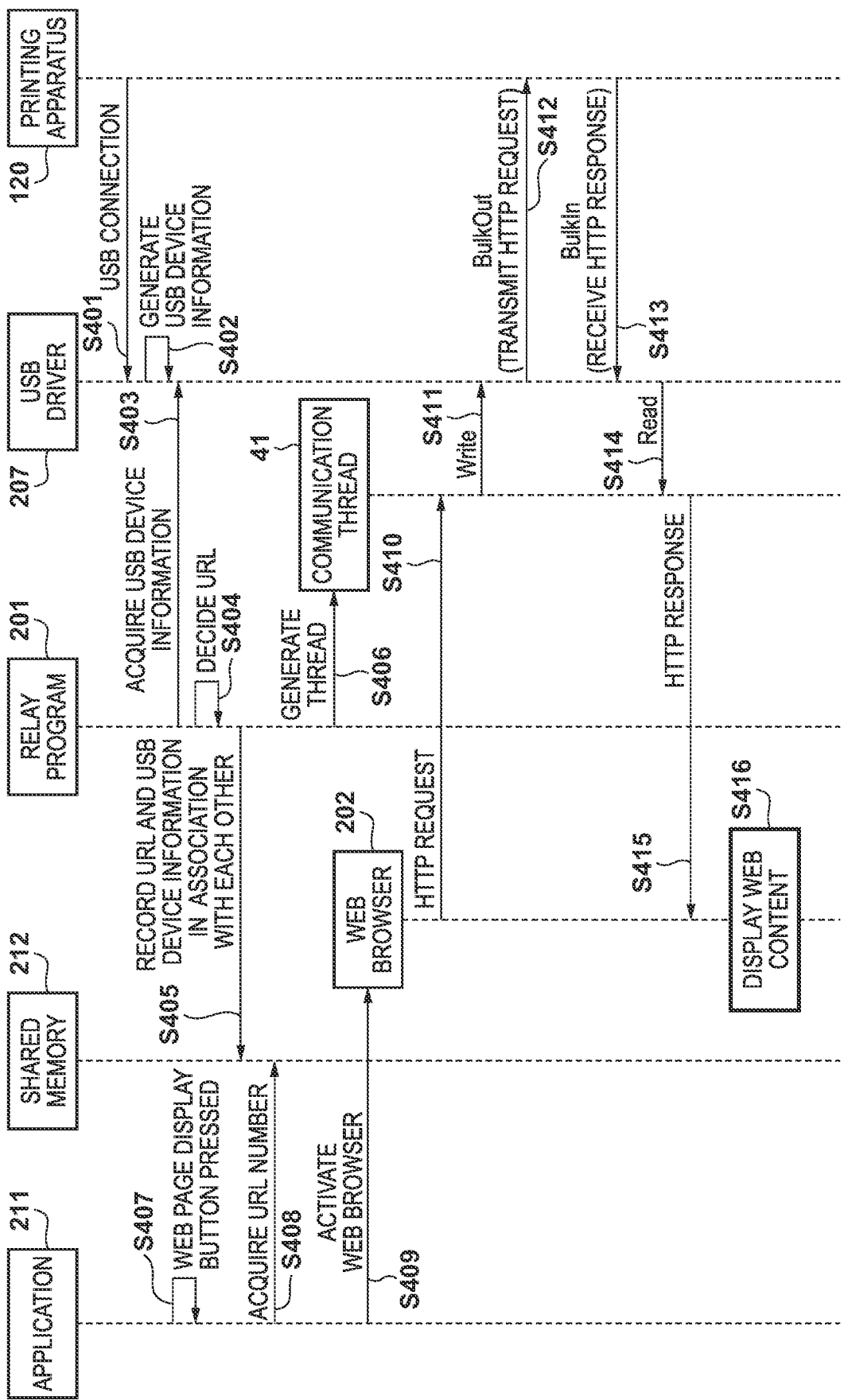
FIG. 4 is a sequence diagram illustrating communication processing of the entirety of the system in the first embodiment.

FIG. 4 illustrates an overall image of a communication process in the present embodiment. Elements left of the printing apparatus 120 are software configuration elements of the information processing apparatus 110. Therefore, a processing step in accordance with the printing apparatus 120 is executed by the CPU 124, and a processing step in accordance with the information processing apparatus 110 is executed by the CPU 112. When the printing apparatus 120 is connected to the information processing apparatus 110 via a USB interface (step S401), the USB driver 207 generates device information of the connected printing apparatus 120 (step S402). The device information generated in step S402 includes various descriptor information defined by a USB specification such as a USB device descriptor, a string descriptor, and an interface descriptor of the printing apparatus 120.

The relay program 201 first acquires, from the USB driver 207, device information of the printing apparatus 120 which is connected to the information processing apparatus 110 (step S403). Next, the relay program 201 decides a URL including a port number for performing HTTP communication with the web browser 202 (step S404). The relay program 201 dynamically selects a TCP port number used for the processing of the present embodiment from TCP port numbers that are not used by other applications and are not blocked by a security function such as a firewall. By performing this processing, for example, more convenient processing can be provided to a user in comparison to a case where the TCP port number used for TCP/IP communication between the application and the relay program is set as a fixed value. For example, even if a TCP port number which is set as the fixed value cannot be used due to a setting of the information processing apparatus, a security function, or the like, a usable port number is selected in step S404. Therefore, it is possible to continuously execute the processing described later.

Next, the relay program 201 records the device information of the printing apparatus 120 acquired in step S403 and the URL decided in step S404 in the shared memory 212 in association with each other (step S405). Next, the relay program 201 activates a communication thread 41 for actually performing HTTP communication with the web browser 202 (step S404). Note that the communication thread 41 may be referred to as a communication unit. At this time, the relay program 201 notifies the communication thread 41 of the URL decided in step S404 and the printing apparatus device information that is associated with the URL. Here, a communication thread may be generated and activated for each printing apparatus. For example, in FIG. 4, since there is only one printing apparatus, there is also one generated communication thread. However, if a plurality of printing apparatuses are connected and respective device information is acquired (or if respective URLs are generated and recorded), a corresponding plurality of communication threads may be generated.

Meanwhile, when the web page display button 303 is pressed in accordance with a user operation (step S407), the application 211 refers to the shared memory 212 and acquires the URL associated with the printing apparatus 120 which was selected on the screen of FIG. 3 (step S408). In FIG. 4, the URL acquired in step S408 is a URL associated with USB device information of the printing apparatus 120, which is a USB device, that was stored in step S405 by the relay program 201. Thereafter, the application 211 activates the web browser 202, designating the URL acquired in step S408 (step S409). The web browser 202 transmits, in relation to the designated URL, an HTTP request (a GET request) for acquiring Web content (step S410). In the present embodiment, a communication thread corresponding to the designated URL is the communication thread 41. Therefore, the communication thread 41 first receives the HTTP request that was transmitted in step S410. The communication thread 41 that received the HTTP request specifies the printing apparatus 120 to communicate with, from the printing apparatus USB device information that was notified by the relay program 201 in step S406. Then, the communication thread 41 transmits an HTTP request to the specified printing apparatus 120 via the USB driver 207 (step S411 and step S412).

The communication thread 41 performs HTTP communication with the printing apparatus 120 by USB in the following manner, for example. The communication thread 41 waits for an HTTP request in which the port number included in the notified URL is a destination port number. Upon receipt of the corresponding HTTP request, the communication thread 41 frames the HTTP request according to a USB protocol and forwards it via USB to the printing apparatus 120. Also, when a USB frame is received from the printing apparatus 120 via USB, the communication thread 41 transfers an HTTP response which is the payload of the USB frame to the web browser 202. The HTTP response has been generated by the HTTP control unit 209 of the printing apparatus 120, and the communication thread 41 may transfer it as is. In the printing apparatus 120, for example, the USB control unit 208 extracts an HTTP request from the payload of a USB frame received from the information processing apparatus 110, and transfers the request to the HTTP control unit 209. Conversely, the USB control unit 208 transmits an HTTP response received from the HTTP control unit 209 to the information processing apparatus 110 as the payload of a USB frame. It is needless to say that this is an example, and, for example, the division and content of processing are not limited to this.

When the transmission of the HTTP request is completed, the communication thread 41 next acquires, from the printing apparatus 120, an HTTP response to the transmitted HTTP request via the USB driver 207 (step S413 and step S414). Note that the printing apparatus 120 returns an HTTP response to the HTTP request in accordance with the web content managing unit 210. The communication thread 41, which acquired the HTTP response that was acquired by the processing of step S413 and step S414, replies to the web browser 202 with the acquired HTTP response (step S415). The web browser 202 that received the HTTP response in step S415 displays information of the Web content included in the received HTTP response (step S416). By such communication processing, the web browser 202 can display Web content generated by the printing apparatus 120 which is connected via the USB interface. The relay program 201 can realize a plurality of connections by generating a plurality of threads, for example.

Processing Procedure by the Relay Program 201

Figure 5:
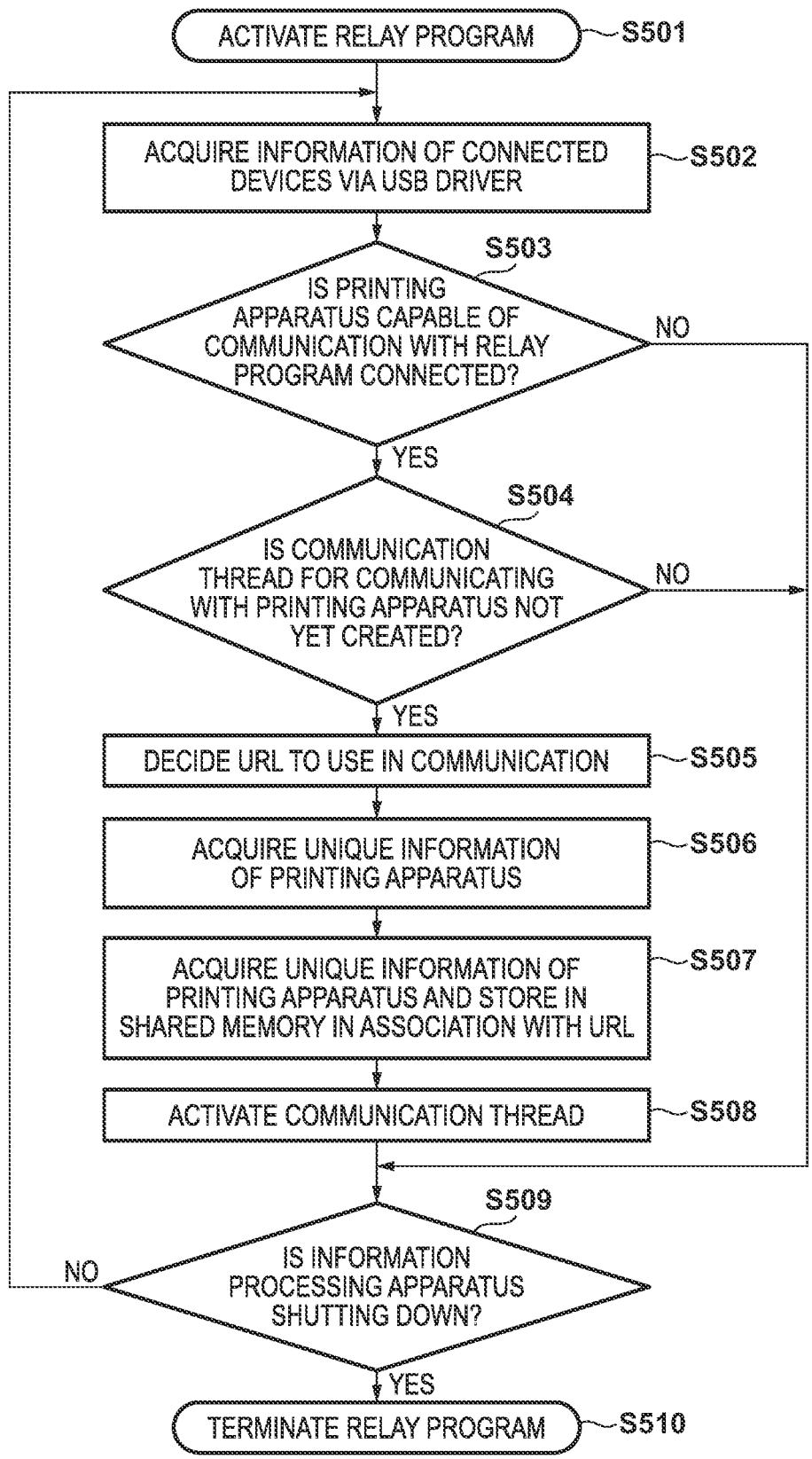
FIG. 5 is a flow chart illustrating processing of a relay program in the first embodiment.

In FIG. 5, the processing of the relay program 201 in the processing sequence of FIG. 4 will be described in more detail. In the present embodiment, it is assumed that the relay program 201 has been arranged (installed) in the information processing apparatus 110 in advance by an installer, a user operation, or the like. The relay program 201 starts processing (step S501) alongside activation of the information processing apparatus 110. That is, the relay program 201 is a resident program that is automatically activated alongside activation of the information processing apparatus 110. Next, the relay program 201 acquires, from the USB driver 207, device information of a peripheral apparatus connected to the information processing apparatus 110 via a USB interface (step S502). Thereafter, the relay program 201 determines, based on the information acquired in step S502, whether or not a printing apparatus 120 that is capable of communicating with the relay program 201 is connected to the information processing apparatus 110 (step S503). As a specific determination method, there is a method of referring to the interface descriptor information of a connected apparatus and deeming that the relay program 201 can communicate with an apparatus that supports a predetermined protocol. An example of a protocol may be IPP over USB which is for performing IPP (Internet Printing Protocol) via USB. When YES is determined in step S503, the relay program 201 determines whether or not a communication thread for actually communicating with the printing apparatus 120 and the web browser 202 has been activated (step S504). In this embodiment, it is assumed that the relay program 201 refers to the shared memory 212 and determines whether or not a communication thread has been activated based on whether or not a URL associated with the printing apparatus has already been recorded.

If it is determined in step S504 that a communication thread is not yet created, the relay program 201 decides a URL, which includes a port number, that the communication thread 41 will use to communicate with the web browser 202 (step S505). An example of a URL is as follows.

http://localhost:61234/index.html

Here, it is assumed that the port number included in the URL is dynamically selected from port numbers that are not used by other applications and are not blocked by a security function such as a firewall. Note that it is possible to know TCP and UDP port numbers that are used in a typical operating system. Therefore, for example, if a blocked port number is stored in advance, a port number to be used can be selected from among unused and unblocked port numbers. It is similar for other embodiments described later. The host name may also be a loopback address as indicated here. Next, the relay program 201 acquires, from the USB device information acquired in step S502, unique information for uniquely specifying the printing apparatus 120 (step S506). As concrete unique information, a vendor ID, a product ID, and a serial number in a string descriptor incorporated in the printing apparatus 120 are used. In the present embodiment, it is assumed that the respective values are the following values.

Vendor ID: VID_04A9
Product ID: PID_1234
Serial number: ABC1234

Next, the relay program 201 records the URL, which includes the port number decided in step S505, and the unique information of the printing apparatus 120 acquired in step S506 in association with one another in the shared memory 212 (step S507). Next, the relay program 201 activates a communication thread 41 for actually performing communication with the printing apparatus 120 and the web browser 202 (step S508). At this time, the relay program 201 notifies the activated communication thread 41 of the URL, which includes the port number decided in step S505, and the unique information of the printing apparatus 120 acquired in step S506. Thereafter, the relay program 201 acquires the present state information of the information processing apparatus 110, and determines whether or not the information processing apparatus 110 is shutting down (whether shutdown processing is underway) (step S509). If it is determined in step S509 that the information processing apparatus 110 is shutting down, the relay program 201 terminates the processing.

When the relay program 201 determines NO in the determination processing of step S503 or step S504 (that is, if it is determined that a printing apparatus capable of communication is not connected or if it is determined that a communication thread for communicating with the printing apparatus has been created) the processing proceeds to step S509. In the present embodiment, the URL deciding processing in step S505 is performed prior to the activation of the communication thread, but the activated communication thread itself may be configured to perform URL deciding processing corresponding to step S505. Although the vendor ID, the product ID, and the serial number in the string descriptor are used as the unique information of the printing apparatus, there is no limitation to these pieces of information and the unique information may be any information that uniquely specifies the printing apparatus. Through the above procedures, the relay program 201 acquires USB device information, stores the USB device information in association with the created URL, and generates a communication thread for relaying an HTTP request addressed to the URL and a corresponding HTTP response.

FIG. 6 conceptually illustrates how a URL, which includes port number, and unique information of the printing apparatus 120 are recorded in association with each other in the shared memory. For example, it is indicated that "VID_04A9&PID_1234&ABC1234", which is unique information of a printing apparatus, is recorded in association with http://localhost:61234/index.html. Any application can acquire a URL corresponding to a respective printing apparatus by referring to this information.

Processing Procedure by Communication Thread

Figure 7:
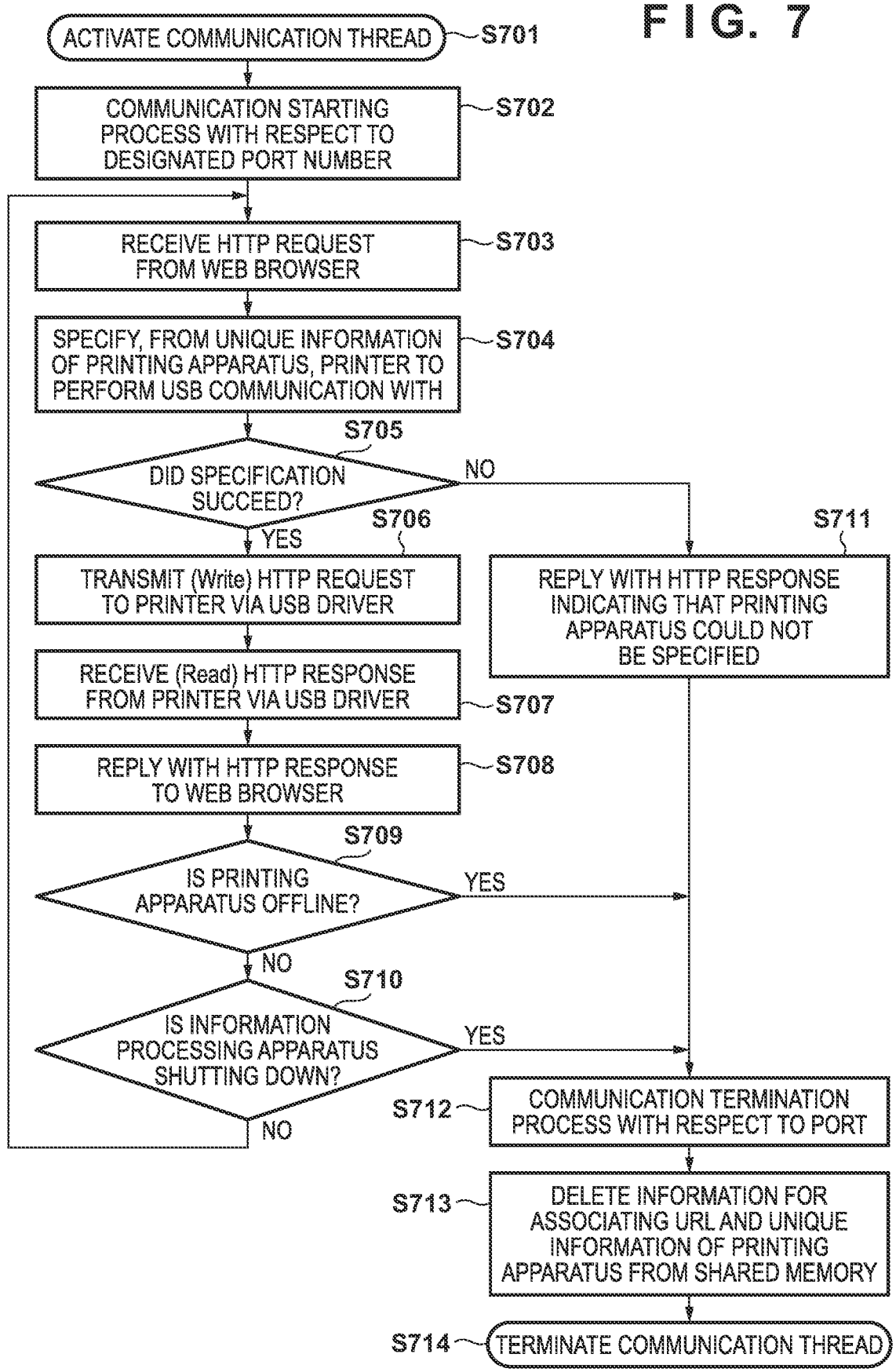
FIG. 7 is a flow chart of the communication thread in the first embodiment.

With reference to FIG. 7, processing of the communication thread 41 which is activated by the relay program 201 will be described in detail. The communication thread 41 is activated by the relay program 201 (step S701). Next, the communication thread 41 acquires the port number from the URL notified from the relay program 201, and performs a communication starting process with respect to the port number (step S702). Specifically, the communication thread 41 determines whether or not there is a request for the acquired port number. This process enables communication using the port number thereafter. The communication thread 41 may wait for reception of an HTTP request after step S702. Next, the communication thread 41 receives an HTTP request from the web browser 202 which is activated by the application 211 (step S703). Here, it is assumed that the following HTTP request is received.

GET/index.html HTTP/1.1
Host: localhost:61234

Next, the communication thread 41 attempts to identify a printing apparatus that matches the unique information of the printing apparatus 120 notified by the relay program 201 (step S704). Specifically, the communication thread 41 is notified of the unique information when the communication thread is activated by the relay program in step S508. Therefore, the communication thread 41 acquires from the OS a list of devices that are connected by USB to the information processing apparatus 110. Then, the communication thread 41 specifies a device in the list of devices that corresponds to the unique information notified in step S508, thereby realizing step S704. At this time, the communication thread 41 acquires information necessary for communication with the printing apparatus 120 from the OS. USB communication is realized by using this information in step S706, which is described later. Next, the communication thread 41 determines whether or not specification of the printing apparatus in step S704 succeeded (step S705). If a printing apparatus that matches the unique information of the printing apparatus 120 notified from the relay program 201 cannot be specified, the communication thread 41 replies to the web browser 202 with an HTTP response indicating that the printing apparatus to be communicated with could not be specified (step S711). Here, the following HTTP response is transmitted.

HTTP/1.1 404 Not Found

Thereafter, the communication thread 41 executes a communication termination process for the port number for which the communication processing was started in step S702 (step S712).

If it was possible to specify the printing apparatus that matches the unique information of the printing apparatus 120, next the communication thread 41 transmits (Write) the received HTTP request to the printing apparatus 120 via the USB driver 207 (step S706). Next, the communication thread 41 receives (Read) a response to the transmitted HTTP request from the printing apparatus 120 via the USB driver 207 (step S707). Thereafter, the communication thread 41 replies to the web browser 202 with the received response as an HTTP response (step S708). Next, the communication thread 41 checks the power supply state of the printing apparatus 120 and determines whether or not it is in an online state (that is, whether or not communication is possible) (step S709). When it is determined that the printing apparatus 120 is in an online state, next the communication thread 41 acquires state information of the information processing apparatus 110 and determines whether or not the information processing apparatus 110 is shutting down (step S710). When it is determined in step S710 that the information processing apparatus 110 is not shutting down, the communication thread 41 returns to step S703 and receives an HTTP request from the web browser 202 again. In contrast, when it is determined in step S709 that the printing apparatus 120 is in an offline state or it is determined in step S710 that the information processing apparatus 110 is shutting down, the communication thread 41 executes a communication termination process for the port number for which the communication process was started in step S702 (step S712). Subsequently, the communication thread 41 deletes information for associating the printing apparatus 120 and the URL that were recorded in the shared memory 212 (step S713). Thereafter, the communication thread 41 ends the processing (step S714).

As described above, according to the present embodiment, the relay program 201 generates a URL that includes a port number for one printing apparatus. At this time, the relay program 201 preferably dynamically selects the port number from port numbers that are not used by other applications and are not blocked by a security function such as a firewall. Therefore, even when available ports are limited, the web browser 202 executed by the information processing apparatus 110 can appropriately communicate with a USB-connected printing apparatus.

In addition, according to the present embodiment, the relay program 201 generates a URL that includes a port number each time a printing apparatus is connected to the information processing apparatus, and individually generates a thread for communicating with the web browser using the port number. Therefore, even if a plurality of models are connected, the web browser 202 and the respective printing apparatuses can appropriately communicate with each other.

Further, according to the present embodiment, the generated URL is recorded in the shared memory 212 in association with the unique information of the printing apparatus. Therefore, by any application acquiring the URL recorded in the shared memory 212, the application can activate a web browser and display a Web page of the printing apparatus. That is, even when a plurality of printing apparatuses are connected to the information processing apparatus by USB, a URL including a port number assigned to each printing apparatus can be decided and stored in association with unique information of the respective printing apparatus. As a result, it is possible to assign a unique access destination (a URL) to each individual printing apparatus, and it is possible to access each of the plurality of printing apparatuses from an application or a web browser.

In the above-described embodiment, it is confirmed whether or not a printing apparatus is connected to the information processing apparatus to be in a communicable state, and if a printing apparatus is not in a communicable state, that is, if a printing apparatus is not connected or cannot communicate, the processing of the communication thread may be terminated. When a device (printing apparatus) that is to be a communication partner cannot be specified, for example, the communication thread may reply to the web browser with information (HTTP 404 Not found) indicating that a device to be communicated with is not found.

Second Embodiment

In the present embodiment, an example of solving the problem with a configuration different from that of the first embodiment will be described. In the present embodiment, the relay program itself relays an HTTP request from the web browser. An HTTP request packet transmitted from the web browser to the relay program includes unique information for specifying the printing apparatus to which the request is to be transmitted. The relay program that received the HTTP request uniquely specifies the printing apparatus from the received unique information, and the relay program transmits and receives HTTP packets via the USB interface. Note that, unless particular mention is made below, configuration is similar to that of the first embodiment.

Software Structure

Figure 8:
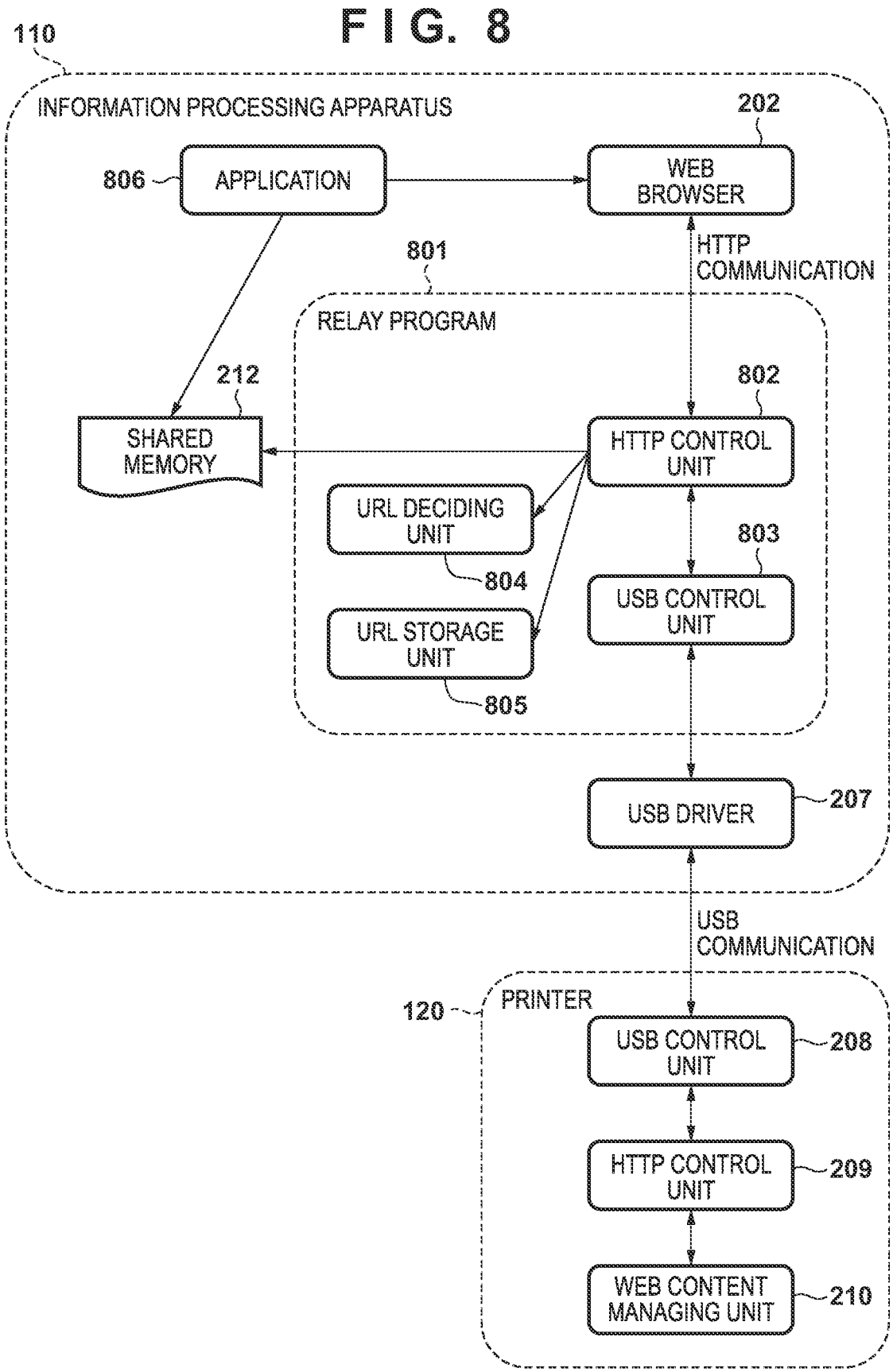
FIG. 8 is a block diagram illustrating a system configuration in a second embodiment.

FIG. 8 is an example of a block diagram conceptually illustrating the configuration of the present embodiment. A relay program 801 runs on the information processing apparatus 110 and relays communication between the web browser 202 and the printing apparatus 120. The relay program 801 includes an HTTP control unit 802, a USB control unit 803, a URL deciding unit 804, and a URL storage unit 805. The HTTP control unit 802 performs HTTP communication with the web browser 202, and transmits an HTTP request received from the web browser 202 to the USB control unit 803. In addition, the HTTP control unit 802 replies to the web browser 202 with information received from the printing apparatus 120 via the USB control unit 803 as an HTTP response. In addition, the HTTP control unit 802 stores, in the shared memory 212, an initial URL for when the web browser 202 starts transmission of an HTTP request to the relay program 801. When the HTTP control unit 802 analyzes an HTTP request packet received from the web browser 202 and specifies the printing apparatus to be communicated with, the URL deciding unit 804 acquires the URL corresponding to the printing apparatus. Further, the HTTP control unit 802 records, in the URL storage unit 805, the information identifying the printing apparatus 120 in association with the URL corresponding to the printing apparatus acquired from the URL deciding unit 804. In contrast, when the Web page display function of the application 806 is executed, the application 806 refers to the shared memory 212 and acquires the initial URL for when the web browser 202 starts transmitting the HTTP request to the relay program 201. Thereafter, the application 806 activates the web browser 202, designating the URL acquired from the shared memory 212.

Procedure for Acquiring Content Via USB (Second Embodiment)

Figure 9:
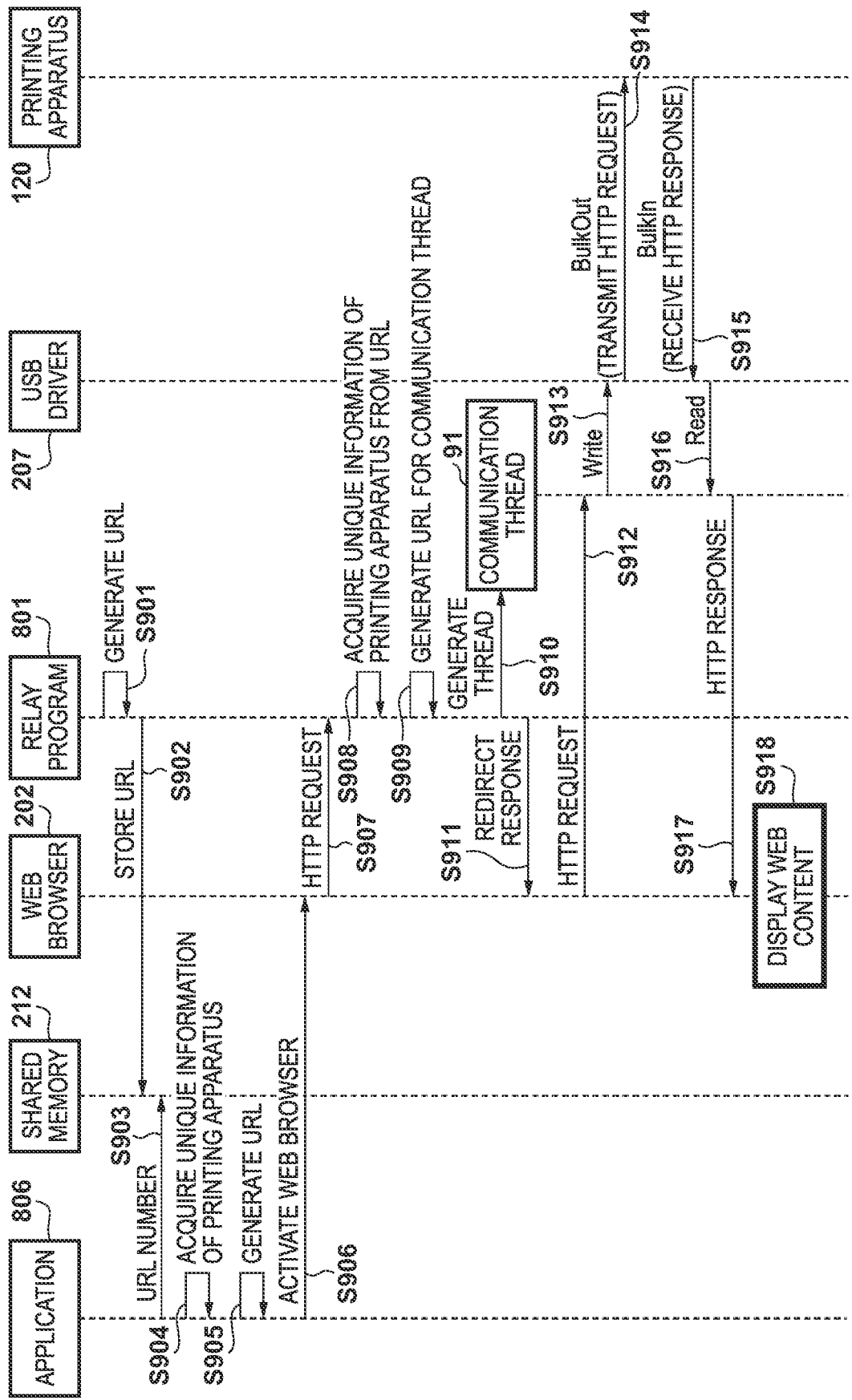
FIG. 9 is a sequence diagram illustrating communication processing of the entirety of the system in the second embodiment.

FIG. 9 illustrates an overall image of a communication process in the present embodiment. Note that, in FIG. 9, prior to step S904, the information processing apparatus 110 has already acquired device information (including unique information) of the USB-connected printing apparatus, and this device information is stored in a predetermined location. Note that the predetermined location is a storage location that is decided by the OS. For example, the application 806 may acquire the device information from the USB driver 207 prior to step S904.

Immediately after being activated, the relay program 801 generates an initial URL for when the web browser 202 starts transmitting an HTTP request to the relay program 801 (step S901). The URL generated at this time has a format including a port number such as http://localhost:<usable port number>. In addition, the port number is dynamically selected from port numbers that are not used by other applications and are not blocked by a security function such as a firewall. Here, for example, it is assumed that 65432 is selected as the port number. Next, the relay program 801 stores the generated initial URL in the shared memory 212 (step S902). Subsequently, the relay program 801 waits for an HTTP request addressed to, for example, the generated port number, and receives a corresponding HTTP request if one arrives.

When the web page display button 303 is pressed in accordance with a user operation, the application 806 refers to the shared memory 212 and acquires the initial URL which was stored in step S902 (step S903). Next, the application 806 acquires the unique information of the printing apparatus selected by the user on a screen of the application 806 (step S904). Here, it is assumed that the vendor ID, the product ID, and the serial number in the device descriptor and the string descriptor which are incorporated in the printing apparatus 120 are acquired, and the respective values are the following values.

Vendor ID: VID_04A9
Product ID: PID_4321
Serial number: PID_4321

Next, the application 806 combines the URL acquired in step S903 with the unique information of the printing apparatus 120 acquired in step S904 to generate a URL to designate when the web browser 202 is activated (step S905). Here, it is assumed that the following URL is generated.

http://localhost:65432/VID_04A9&PID_4321&PID_4321

Thereafter, the application 806 activates the web browser 202, designating the URL created in step S905 (step S906). The web browser 202 transmits, in relation to the designated URL, an HTTP request (a GET request) for acquiring Web content (step S907).

The HTTP request transmitted in step S907 is addressed to the URL generated in step S901, and is temporarily received by the relay program 801. Here, it is assumed that the following HTTP request is received.

GET/VID_04A9&PID_4321&PID_4321 HTTP/1.1
Host: localhost:65432

The relay program 801 which received the HTTP request analyzes the URL information included in the HTTP request, and acquires from the URL the unique information of the printing apparatus to which the HTTP request is to be transmitted (step S908). Next, the relay program 801 decides a URL including a port number for the communication thread 91 to perform communication with the web browser 202 (step S909). Here, it is assumed that the port number included in the URL is dynamically selected from port numbers that are not used by other applications and are not blocked by a security function such as a firewall. Thereafter, the relay program 801 activates the communication thread 91 (step S910). At this time, the relay program 801 notifies the activated communication thread 91 of the URL, which includes unique information of the printing apparatus 120 acquired in step S908 and the port number decided in step S909. Next, as a reply to the HTTP request received in step S907, the relay program 801 transmits to the web browser 202 an HTTP response instructing redirection to the URL decided in step S909. Here, it is assumed that the following HTTP response is transmitted.

HTTP/1.1 307 Temporary Redirect
Location: localhost:65000/index.html

Note that localhost:65000/index.html designated as the redirect destination address is a URL that includes the port number decided in step S909. Here, the redirect instruction is used by the application and the Web browser to share unique information of the printing apparatus and the URL unique to the printing apparatus.

Receiving the redirect response, the web browser 202 transmits again the HTTP request that was transmitted in step S907 to the specified address (in this case, the URL for the communication thread) (step S912). The communication thread 91 receives the HTTP request that was transmitted in step S912. The communication thread 91 that received the HTTP request specifies a printing apparatus to communicate with, from the unique information of the printing apparatus notified from the relay program 801, and transmits an HTTP request to the printing apparatus via the USB driver 207 (step S913 and step S914). When the transmission of the HTTP request is completed, the communication thread 91 next acquires an HTTP response to the transmitted HTTP request from the printing apparatus 120 via the USB driver 207 (step S915 and step S916). The communication thread 91, which acquired the HTTP response that was acquired by the processing of step S915 and step S916, replies to the web browser 202 with the acquired HTTP response (step S917). The web browser 202 that received the HTTP response in step S917 displays information of the Web content included in the received HTTP response (step S918). By such communication processing, the web browser 202 can display Web content generated by the printing apparatus 120 which is connected via the USB interface.

Processing Procedure in Accordance with the Relay Program 801 (Second Embodiment)

Figure 10:
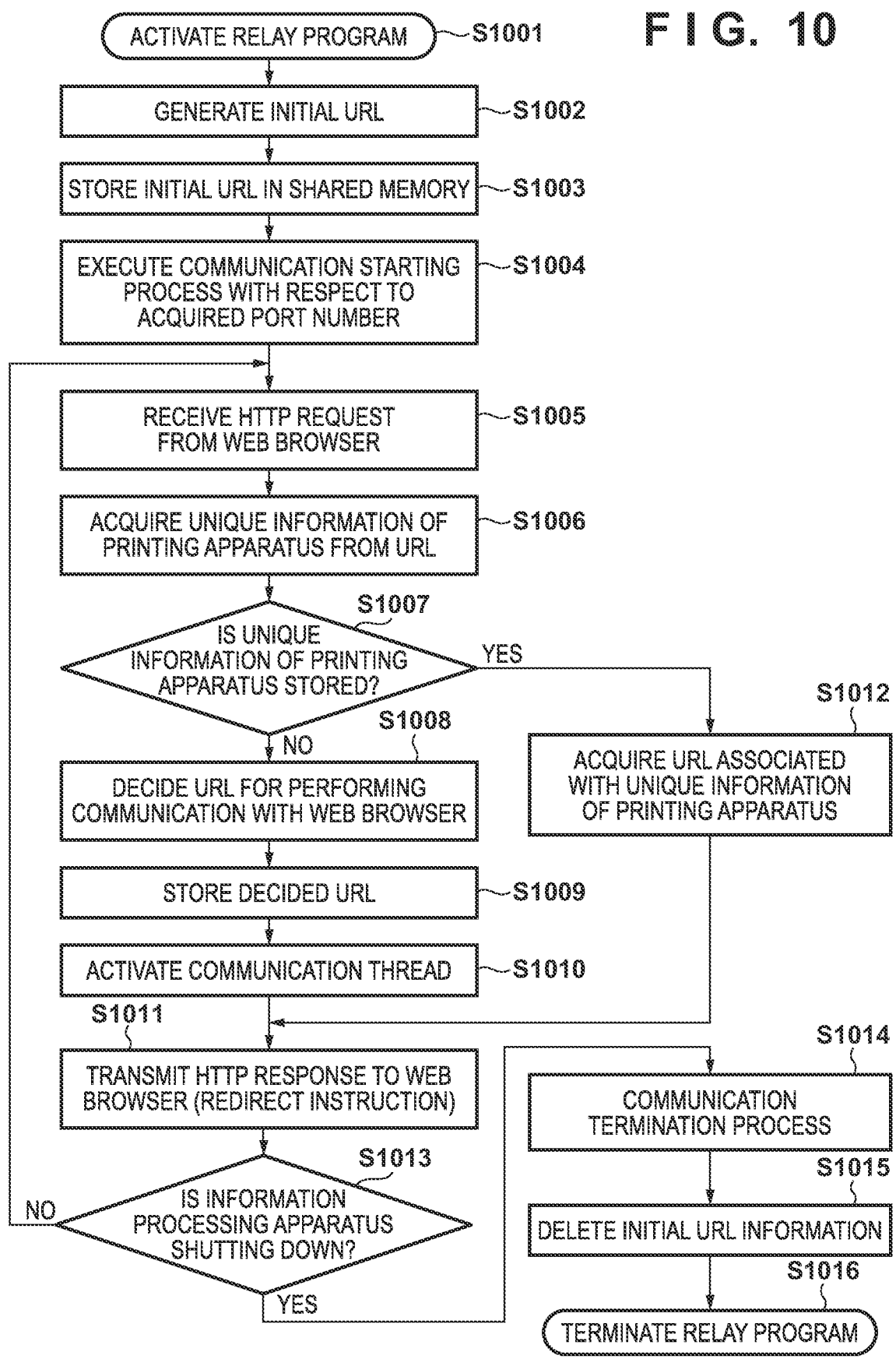
FIG. 10 is a flow chart illustrating processing of a relay program in the second embodiment.

With reference to FIG. 10, the processing of the relay program 801 in the present embodiment will be described in more detail. Note that, in the present embodiment, it is assumed that the relay program 801 has been arranged (installed) in the information processing apparatus 110 in advance by an installer, a user operation, or the like. The relay program 801 starts processing (step S1001) alongside activation of the information processing apparatus 110. Next, the relay program 801 generates an initial URL for when the web browser 202 starts transmitting an HTTP request to the relay program 801 (step S1002). Here, it is assumed that the port number included in the URL is dynamically selected from port numbers that are not used by other applications and are not blocked by a security function such as a firewall. Next, the relay program 801 stores the generated initial URL in the shared memory 212 (step S1003). Subsequently, the relay program 801 performs a communication starting process on the port number included in the URL generated in step S1002 (step S1004). Next, the relay program 801 receives an HTTP request from the web browser 202 which is activated by the application 806 (step S1005). Note that the relay program 801 may wait for reception of an HTTP request after step S1004. The relay program 801 which received the HTTP request analyzes the URL information included in the received HTTP request, and acquires from the URL the unique information of the printing apparatus to which the HTTP request is to be transmitted (step S1006). Next, the relay program 801 determines whether or not the unique information of the printing apparatus acquired in step S1006 is already stored in the URL storage unit 805 (step S1007).

In a case where NO is determined in step S1007, the relay program 801 decides a URL including a port number for the communication thread to perform communication with the web browser 202 (step S1008). Subsequently, the relay program 801 stores the URL, which includes the port number decided in step S1008, and the unique information of the printing apparatus 120 acquired in step S1006 in association with one another in the URL storage unit 805 (step S1009). Subsequently, the relay program 801 activates the communication thread 91 (step S1010), and notifies the communication thread 91 of the URL, which includes the port number decided in step S1008 and the unique information of the printing apparatus 120 acquired in step S1006. Subsequently, as a reply to the HTTP request received in step S1005, the relay program 801 transmits to the web browser 202 an HTTP response instructing redirection to the URL decided in step S1008 (step S1011).

In contrast, when YES is determined in step S1007, the relay program 801 acquires the URL associated with the unique information of the printing apparatus, which was acquired in step S1006, from the URL storage unit 805 (step S1012). Subsequently, as a reply to the HTTP request received in step S1005, the relay program 801 transmits to the web browser 202 an HTTP response instructing redirection to the URL acquired in step S1012 (step S1011). Thereafter, the relay program 801 acquires the state information of the information processing apparatus 110, and determines whether or not the information processing apparatus 110 is shutting down (step S1013). When it is determined in step S1013 that the information processing apparatus 110 is not shutting down, the relay program 801 returns to step S1005 and receives an HTTP request from the web browser 202 again. In contrast, when it is determined in step S1013 that the information processing apparatus 110 is shutting down, the relay program 801 executes a communication termination process for the port number for which the communication process started in step S1004 (step S1014). Thereafter, the relay program 801 deletes the initial URL information stored in step S1003 from the shared memory 212 (step S1015). Subsequently, the relay program 801 ends the processing (step S1016).

Processing Sequence by Communication Thread (Second Embodiment)

Figure 11:
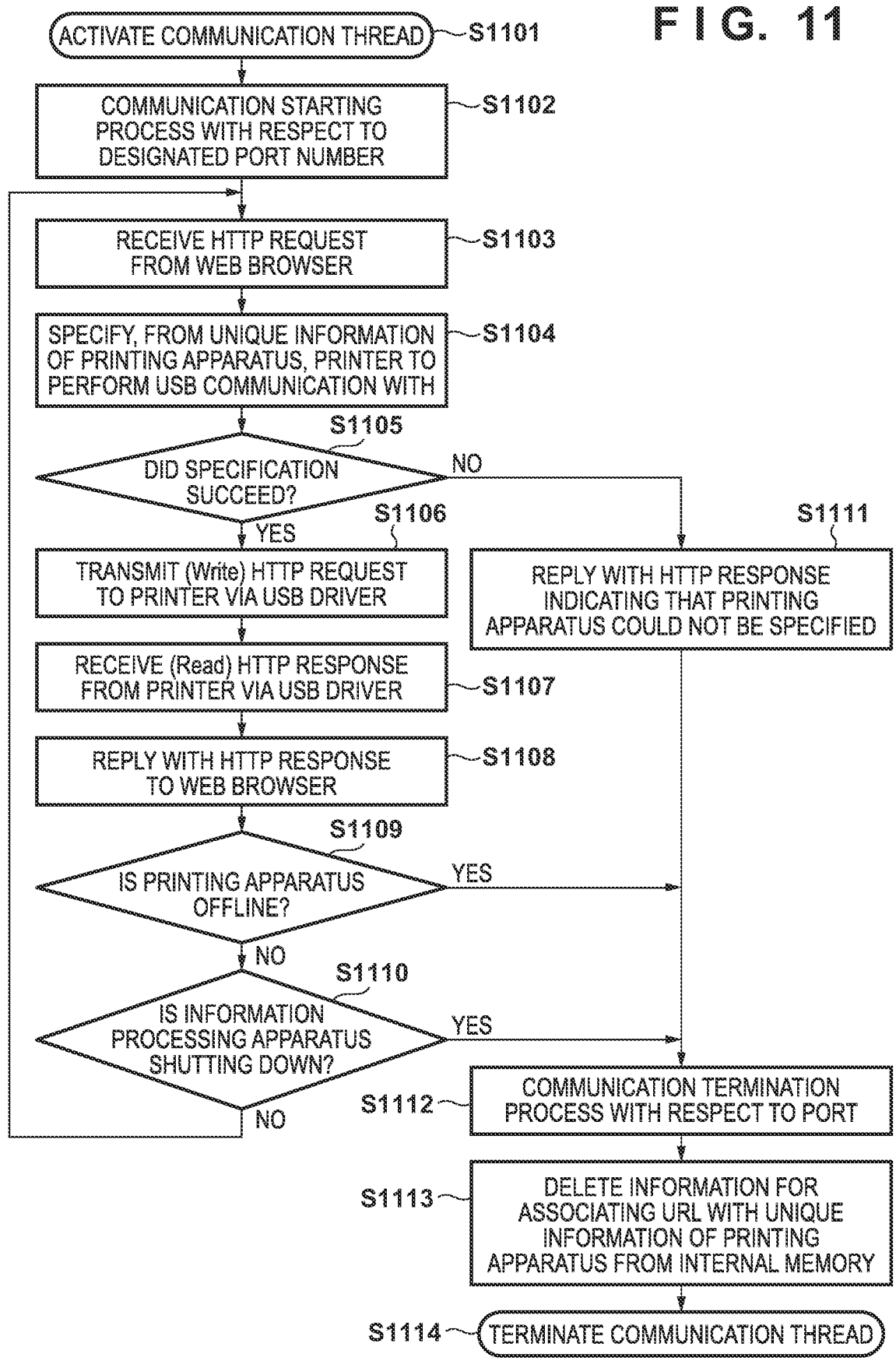
FIG. 11 is a flow chart of the communication thread in the second embodiment.

With reference to FIG. 11, processing of the communication thread 91 which is activated by the relay program 801 will be described in detail. The communication thread 91 is activated by the relay program 801 (step S1101). Next, the communication thread 91 acquires the port number from the URL notified from the relay program 801, and performs a communication starting process with respect to the port number (step S1102). Next, the communication thread 91 receives an HTTP request from the web browser 202 which is activated by the application 806 (step S1103). Here, it is assumed that the following HTTP request is received.

GET/index.html HTTP/1.1
Host: localhost:65000

Next, the communication thread 91 specifies a printing apparatus that matches the unique information of the printing apparatus 120 notified by the relay program 801 (step S1104). Note that the processing performed in step S1104 is the same as that of step S705. Next, the communication thread 91 determines whether or not specification of the printing apparatus in step S1104 succeeded (step S1105). If a printing apparatus that matches the unique information of the printing apparatus 120 notified from the relay program 801 cannot be specified, the communication thread 91 replies to the web browser 202 with an HTTP response indicating that the printing apparatus to be communicated with could not be specified (step S1111). Thereafter, the communication thread 91 executes a communication termination process for the port number for which the communication processing was started in step S1102 (step S1112). If it was possible to specify the printing apparatus that matches the unique information of the printing apparatus 120, next the communication thread 91 transmits (Write) the received HTTP request to the printing apparatus 120 via the USB driver 207 (step S1106). Next, the communication thread 91 receives (Read) a response to the transmitted HTTP request from the printing apparatus 120 via the USB driver 207 (step S1107). Thereafter, the communication thread 91 replies to the web browser 202 with the received response as an HTTP response (step S1108). Next, the communication thread 91 checks the power supply state of the printing apparatus 120 and determines whether or not it is in an online state (step S1109). When it is determined that the printing apparatus 120 is in an online state, next the communication thread 91 acquires state information of the information processing apparatus 110 and determines whether or not the information processing apparatus 110 is shutting down (step S1110). When it is determined in step S1110 that the information processing apparatus 110 is not shutting down, the communication thread 91 returns to step S1103 and receives an HTTP request from the web browser 202 again. In contrast, when it is determined in step S1109 that the printing apparatus 120 is in an offline state or it is determined in step S1110 that the information processing apparatus 110 is shutting down, the communication thread 91 executes a communication termination process for the port number for which the communication process was started in step S1102 (step S1112). Subsequently, the communication thread 91 deletes information for associating the unique information of the printing apparatus 120 and the URL that were recorded in the URL storage unit 805 (step S1113). Thereafter, the communication thread 91 ends the processing (step S1114). As described above, according to the present embodiment, the port number used for communication between the web browser 202 and the relay program 801 and the port number used for communication between the web browser 202 and the communication thread 91 are dynamically selected. At this time, a selected port number is selected from port numbers that are not used by other applications and are not blocked by a security function such as a firewall. Therefore, even when available ports are limited, the web browser 202 executed by the information processing apparatus 110 can appropriately communicate with a USB-connected printing apparatus.

In addition, because the relay program 801 receives an HTTP request from the web browser 202 that contains the unique information of a printing apparatus to thereby specify the printing apparatus to be communicated with, even if multiple models are connected, the web browser 202 can appropriately communicate with each printing apparatus.

Third Embodiment

Note that, in the previous two embodiments described above, it is assumed that the relay program has been arranged (installed) in the information processing apparatus 110 in advance by an installer, a user operation, or the like, and that the relay program is activated in conjunction with activation of the information processing apparatus. In the present embodiment, a configuration in which the relay program does not operate as a resident program will be described. That is, when the web page display button of an application is pressed in accordance with a user operation, the application itself activates the relay program. Note that, unless particular mention is made below, configuration is similar to that of the first embodiment or the second embodiment.

Figure 12:
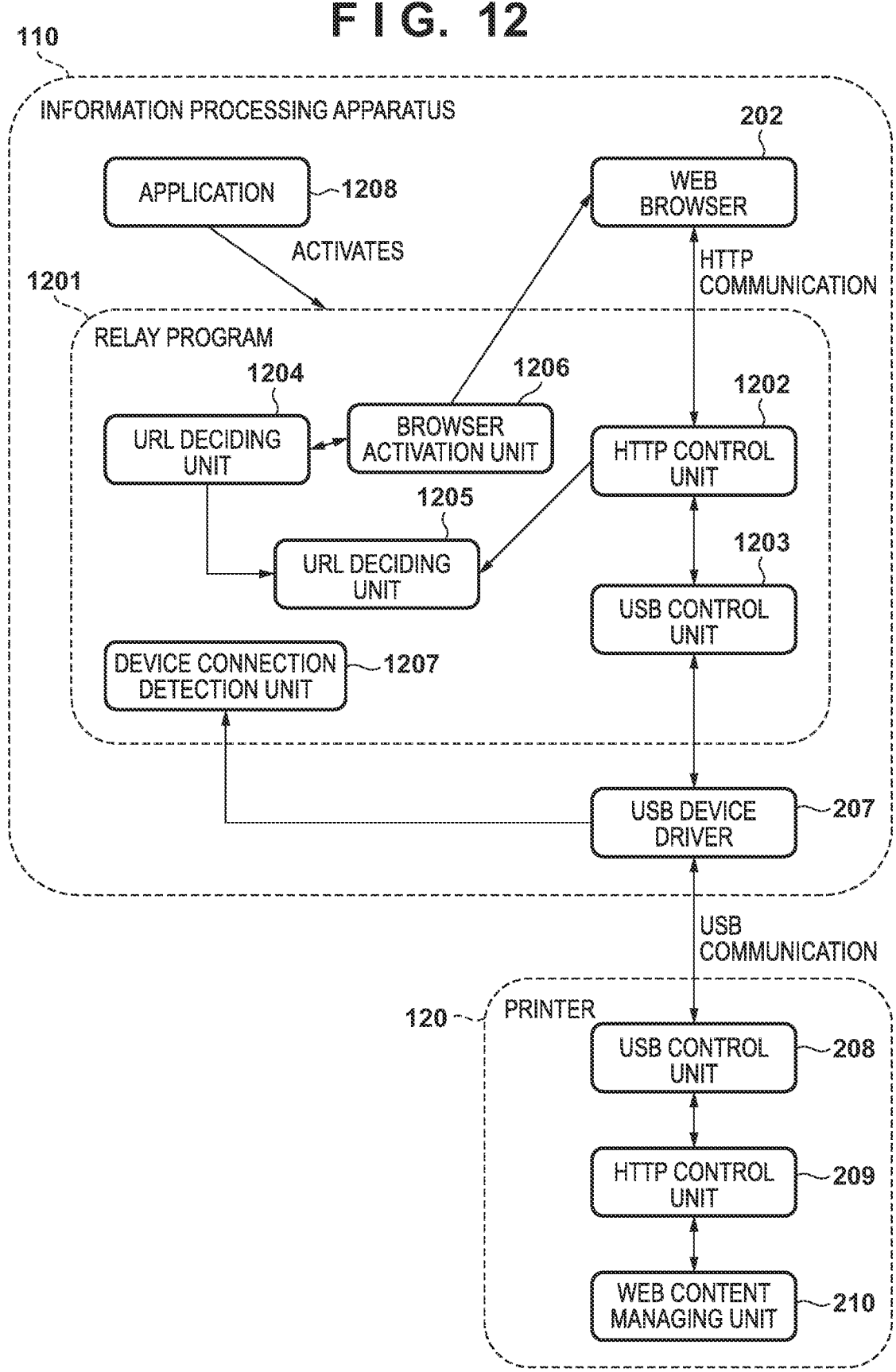
FIG. 12 is a block diagram illustrating a system configuration in a third embodiment.

FIG. 12 is an example of a block diagram conceptually illustrating the configuration of the present embodiment. A relay program 1201 is activated by an application 1208, and relays communication between the web browser 202 and the printing apparatus 120. The relay program 1201 includes an HTTP control unit 1202, a USB control unit 1203, a URL deciding unit 1204, a URL storage unit 1205, a browser activation unit 1206, and a device connection detection unit 1207. The HTTP control unit 1202 performs HTTP communication with the web browser 202, and transmits an HTTP request received from the web browser 202 to the USB control unit 1203. In addition, the HTTP control unit 1202 replies to the web browser 202 with information received from the printing apparatus 120 via the USB control unit 1203 as an HTTP response. The device connection detection unit 1207 detects, from information of peripheral apparatuses connected via the USB interface acquired from the USB driver 207, that a printing apparatus capable of communicating with the relay program 201 is connected. The browser activation unit 1206 activates the web browser 202 by designating a URL corresponding to the printing apparatus acquired from the URL deciding unit 1204. The URL storage unit 1205 stores the unique information of the printing apparatus 120 and the URL corresponding to the printing apparatus generated by the URL deciding unit 1204 in association with each other.

Procedure for Acquiring Content Via USB (Third Embodiment)

FIG. 13 illustrates an overall image of a communication process in the present embodiment. Note that, in FIG. 13, as in the second embodiment, prior to step S1301, the information processing apparatus 110 has already acquired device information (including unique information) of a USB-connected printing apparatus, and stored the device information in a predetermined location. For example, the application 1208 may acquire the device information from the USB driver 207 prior to step S1301. When the web page display button 303 is pressed in accordance with a user operation, the application 1208 acquires the unique information of the printing apparatus selected by the user on the screen of the application 1208 (step S1301). Next, the application 1208 designates the unique information of the printing apparatus acquired in step S1301, and activates the relay program 1201 (step S1302). The activated relay program 1201 decides a URL including a port number for performing HTTP communication with the web browser 202 (step S1303). Here, it is assumed that the port number included in the URL is dynamically selected from port numbers that are not used by other applications and are not blocked by a security function such as a firewall. Next, the relay program 1201 stores, in the URL storage unit 805, the URL decided in step S1303 and the unique information of the printing apparatus instructed by the application 1208 in association with each other (step S1304). Thereafter, the relay program 1201 activates the web browser 202, designating the URL decided in step S1303 (step S1305). The web browser 202 transmits, in relation to the designated URL, an HTTP request (a GET request) for acquiring Web content (step S1306).

The HTTP request transmitted in step S1306 is received by the relay program 1201. The relay program 1201, which received the HTTP request, specifies the printing apparatus to communicate with, from the device information of the printing apparatus notified from the application 1208 at the time of activation. Then, the relay program 1201 transmits an HTTP request to the printing apparatus via the USB driver 207 (step S1307 and step S1308). When the transmission of the HTTP request is completed, the relay program 1201 next acquires an HTTP response to the transmitted HTTP request from the printing apparatus 120 via the USB driver 207 (step S1309 and step S1310). The relay program 1201, which acquired the HTTP response that was acquired by the processing of step S1309 and step S1310, replies to the web browser 202 with the acquired HTTP response (step S1311). The web browser 202 that received the HTTP response in step S1311 displays information of the Web content included in the received HTTP response (step S1312). By such communication processing, the web browser 202 can display Web content generated by the printing apparatus 120 which is connected via the USB interface.

Note that, in FIG. 13, in step S1303, the web browser 202 generates a URL for transmitting an HTTP request to the relay program 1201. Configuration may be taken to generate a URL for transmitting an HTTP request to a communication thread (not illustrated) in conjunction with activating the communication thread. Note that, although the relay program 1201 is activated by the application 1208 in FIG. 13, the relay program 1201 may be activated by another application (that is, any application).

Processing Procedure in Accordance with the Relay Program (Third Embodiment)

Figure 14B:
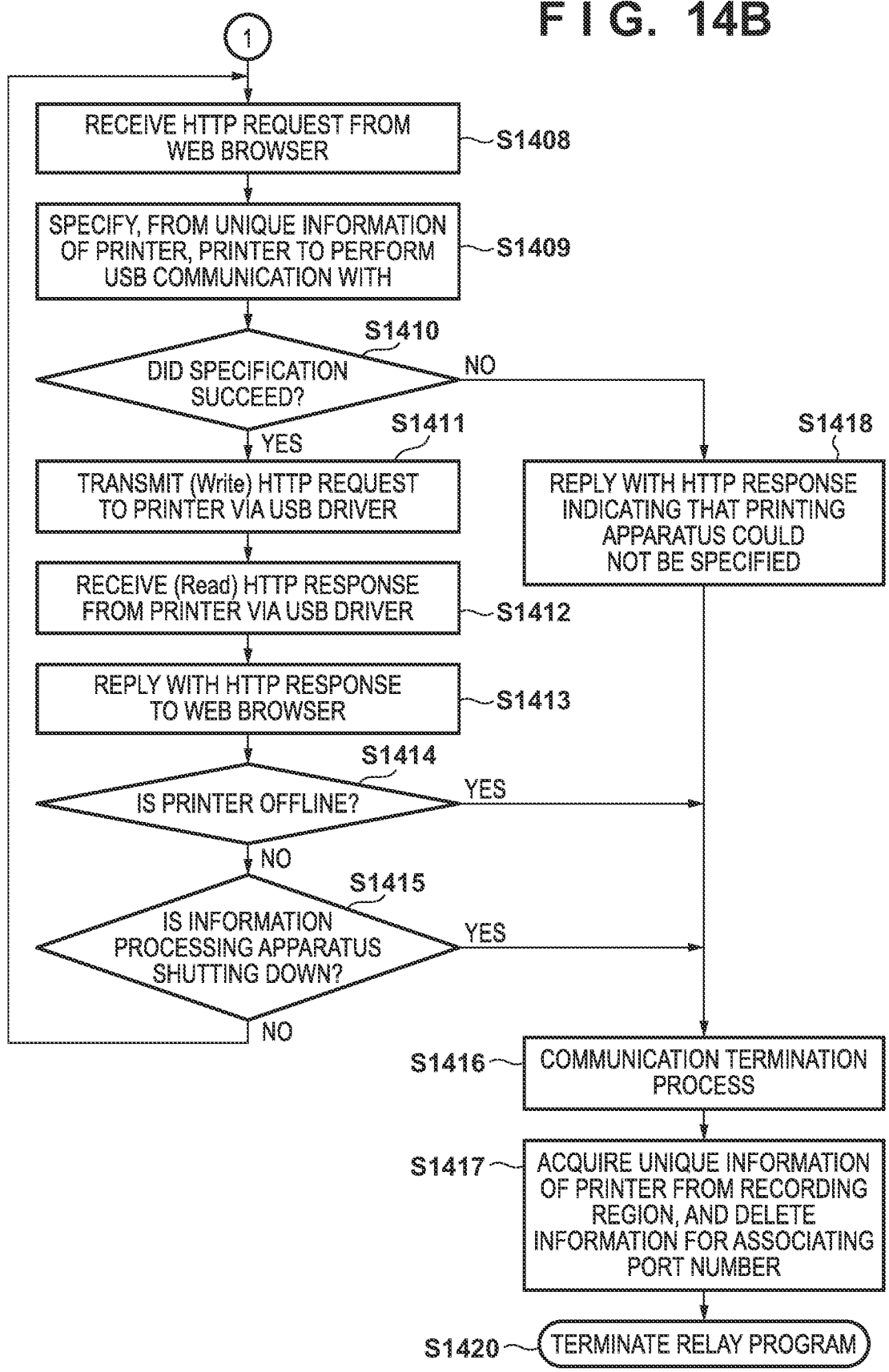

With reference to FIGS. 14A and 14B, the processing of the relay program 1201 in the present embodiment will be described in more detail. The relay program 1201 is activated by the application 1208 and starts processing (step S1401). Next, the relay program 1201 determines whether or not the unique information of the printing apparatus (a printer) that was notified from the application 1208 at the time of activation is stored in the URL storage unit 1205 (step S1402). When the unique information of the printing apparatus designated by the application 1208 is stored in the URL storage unit 1205, the relay program 1201 designates the URL associated with the unique information and activates the web browser (step S1403). Subsequently, the relay program 1201 ends the processing (step S1419). In this situation, since the relay program that communicates with the printing apparatus designated by the application 1208 has already been activated, it is not necessary to activate the relay program again. Therefore, once the URL stored in the URL storage unit 1205 is designated and the web browser 202 is activated, the relay program which was activated earlier performs communication processing with the printing apparatus. In contrast, when the unique information of the printing apparatus is not stored in the URL storage unit 1205 in step S1402, the relay program 1201 decides a URL that includes a port number for communicating with the web browser 202 (step S1404). Here, it is assumed that the port number included in the URL is dynamically selected from port numbers that are not used by other applications and are not blocked by a security function such as a firewall. Next, the relay program 1201 stores the URL that includes the port number decided in step S1404 and the unique information of the printing apparatus designated by the application 1208 in the URL storage unit 805 in association with each other (step S1405). Subsequently, the relay program 1201 performs a communication starting process on the port number included in the URL generated in step S1404 (step S1406). Thereafter, the relay program 1201 activates the web browser 202, designating the URL decided in step S1404 (step S1407). Next, the relay program 1201 receives an HTTP request from the web browser 202 (step S1408). Subsequently, the relay program 1201 specifies a printing apparatus that matches the unique information of the printing apparatus 120 which was notified at the time of activation by the application 1208 (step S1409). Next, the relay program 1201 determines whether or not specification of the printing apparatus in step S1409 succeeded (step S1410). Description will be given regarding a case where a printing apparatus that matches the unique information of the printing apparatus 120 notified from the application 1208 at the time of activation cannot be specified. The relay program 1201 replies to the web browser 202 with an HTTP response indicating that the printing apparatus to be communicated with cannot be specified (step S1418). Here, it is assumed that the following HTTP response is transmitted.

HTTP/1.1 404 Not Found

Thereafter, the relay program 1201 executes a communication termination process for the port number for which the communication processing was started in step S1406 (step S1416). In contrast, when it was possible to specify a printing apparatus that matches the unique information of the printing apparatus 120 in step S1409, the relay program 1201 next transmits (Write) the received HTTP request to the printing apparatus 120 via the USB driver 207 (step S1411). Next, the relay program 1201 receives (Read) a response to the transmitted HTTP request from the printing apparatus 120 via the USB driver 207 (step S1412). Thereafter, the relay program 1201 replies to the web browser 202 with the received response as an HTTP response (step S1413). Next, the relay program 1201 checks the power supply state of the printing apparatus 120 and determines whether or not it is in an online state (step S1414). When it is determined that the printing apparatus 120 is in an online state, the relay program 1201 acquires state information of the information processing apparatus 110 and determines whether or not the information processing apparatus 110 is shutting down (step S1415). When it is determined in step S1415 that the information processing apparatus 110 is not shutting down, the relay program 1201 returns to step S1408 and receives an HTTP request from the web browser 202 again. In contrast, when it is determined in step S1414 that the printing apparatus 120 is in an offline state or it is determined in step S1415 that the information processing apparatus 110 is shutting down, the relay program 1201 executes a communication termination process for the port number for which the communication process was started in step S1406 (step S1416). Subsequently, the relay program 1201 deletes information for associating the unique information of the printing apparatus 120 and the URL that were stored in the URL storage unit 805 (step S1417). Subsequently, the relay program 1201 ends the processing (step S1420).

As described above, according to the present embodiment, a port used for communication between the web browser 202 and the relay program 1201 is dynamically selected. At this time, a selected port number is dynamically selected from port numbers that are not used by other applications and are not blocked by a security function such as a firewall. Therefore, even when available ports are limited, the web browser 202 executed by the information processing apparatus 110 can appropriately communicate with a USB-connected printing apparatus.

According to the present embodiment, the relay program 1201 is activated at a timing when the web page display button 303 of the application 1208 is pressed by a user operation. Therefore, it is unnecessary for the information processing apparatus 110 to activate the relay program 1201 in advance.

Note that, in FIG. 14A, in step S1404, the web browser 202 generates a URL for transmitting an HTTP request to the relay program 1201. Configuration may be taken to instead generate, in step S1404, a URL for transmitting an HTTP request to a communication thread (not illustrated) in conjunction with activating the communication thread. Thus, by generating a plurality of communication threads, a plurality of communications can be processed in parallel.

Fourth Embodiment

In the present embodiment, a description will be given of a mode in which the application switches web browser activation processing in accordance with an operation status of the relay program. Note that, unless particular mention is made below, configuration is similar to that of the first embodiment, the second embodiment, or the third embodiment. The processing described in the present embodiment will be described as something that the application 211 described in the first embodiment executes.

Figure 15:
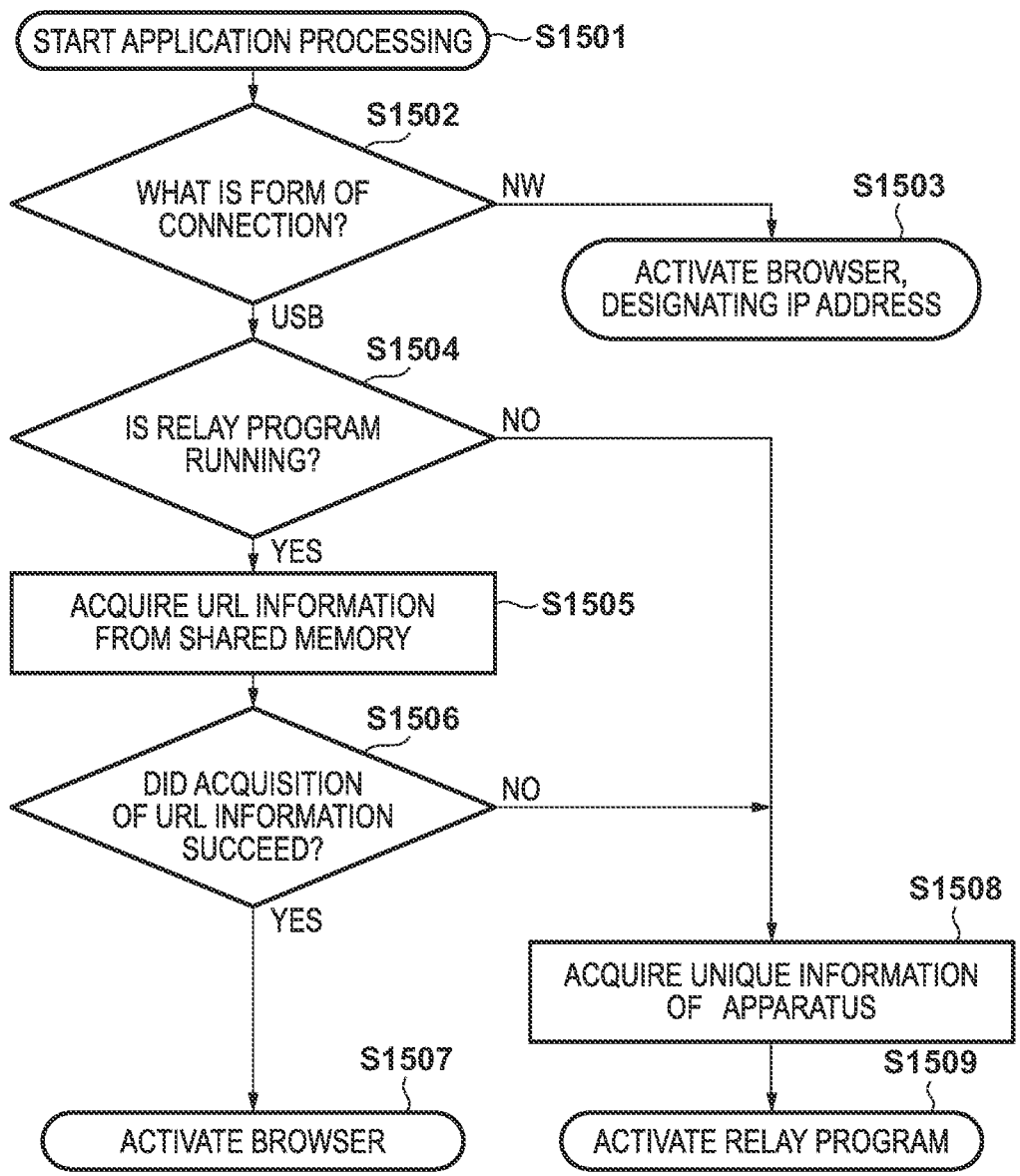
FIG. 15 is a flow chart illustrating processing of an application in a fourth embodiment.

With reference to FIG. 15, description is given regarding processing of the application 211 in the present embodiment. When the web page display button 303 is pressed in accordance with a user operation, the application 211 starts a web browser display process (step S1501). Next, the application 211 confirms the form of connection between a printing apparatus designated by the user and the information processing apparatus 110 (step S1502). When it is determined in step S1502 that the printing apparatus designated by the user and the information processing apparatus 110 are network-connected, the application 211 activates the web browser 202, designating an IP address corresponding to the printing apparatus (step S1503). In contrast, when it is determined in step S1502 that the printing apparatus designated by the user and the information processing apparatus 110 are USB-connected, the application 211 determines whether or not a relay program is running on the information processing apparatus 110 (step S1504). If it is determined that a relay program is operating in step S1504, the application 211 acquires a URL corresponding to the printing apparatus designated by the user from the shared memory 212 (step S1505). Next, the application 211 determines whether or not the URL corresponding to the printing apparatus designated by the user has been successfully acquired (step S1506). If the URL has been successfully acquired, the application 211 activates the web browser 202, designating the URL (step S1507). In this situation, since the relay program having the configuration described by the first embodiment or the second embodiment is already in operation, the application 211 only needs to activate the web browser 202, designating the acquired URL. In contrast, when it is determined in step S1504 that the relay program is not operating or when it is determined in step S1506 that URL acquisition failed, the application 211 acquires the unique information of the printing apparatus designated by the user (step S1508). Thereafter, the application 211 designates the acquired unique information, and activates the relay program (step S1509). In this situation, the relay program 201 is not operating when the user presses the web page display button 303 on the application 211. Therefore, the application 211 designates the unique information of the printing apparatus and activates the relay program having the configuration illustrated in the third embodiment.

Note that, as a technique of determining whether or not a relay program is running in step S1502, a method of making a determination from the type of operating system running on the information processing apparatus and the version information thereof may be used in addition to checking the operation status of the relay program itself.

By this procedure, it is possible for the application to switch web browser activation processing in accordance with an operation status of the relay program. Specifically, double activation of the relay application which is already activated can be prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-172828, filed Sep. 14, 2018 which is hereby incorporated by reference herein in its entirety.

What is claimed is:

1. An information processing apparatus operable to connect to a device, comprising:
   a selection unit configured to select a free port number that is not used by a program in the information processing apparatus;
   a determination unit configured to determine access information including the selected free port number; and
   an activation unit configured to perform activation processing that activates a browser using the determined access information,
   wherein
   data is acquired from the device by accessing the device using the access information,
   a web page is displayed based on the data acquired from the device, and
   the selection unit, the determination unit, and the activation unit are implemented by at least one processor of the information processing apparatus.

2. The apparatus according to claim 1, wherein the access information is a URL.

3. The apparatus according to claim 1, wherein the selection unit selects a free port number of which usage is not restricted by a security function and which is not used by a program of the information processing apparatus.

4. The apparatus according to claim 1, wherein the determination unit determines the access information using the identification information of the device and the free port number.

5. The apparatus according to claim 1, wherein the device is a printing apparatus.

6. The apparatus according to claim 1, wherein the information processing apparatus connects, through a Universal Serial Bus (USB) interface, to the device.

7. A method performed by an information processing apparatus operable to connect to a device, the method comprising:
   selecting a free port number that is not used by a program in the information processing apparatus;
   determining access information including the selected free port number; and performing activation processing that activates a browser using the determined access information,
wherein
data is acquired from the device by accessing the device using the access information, and
a web page is displayed based on the data acquired from the device.

8. The method according to claim 7, wherein the access information is a URL.

9. The method according to claim 7, wherein a free port number is selected, wherein usage of the free port number is not restricted by security function and not used by an program of the information processing apparatus.

10. The method according to claim 7, wherein the access information is determined in the determining using the identification information of the device and the free port number.

11. The method according to claim 7, wherein the device is a printing apparatus.

12. The method according to claim 7, wherein the information processing apparatus connects, through a Universal Serial Bus (USB) interface, to the device.

* * * * *